(12) United States Patent
Shiozaki et al.

(10) Patent No.: US 7,164,858 B2
(45) Date of Patent: Jan. 16, 2007

(54) OPTICAL TRANSMISSION SYSTEM AND OPTICAL TRANSMITTER USED THEREIN

(75) Inventors: Toru Shiozaki, Kobe (JP); Masaru Fuse, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 658 days.

(21) Appl. No.: 10/128,504

(22) Filed: Apr. 24, 2002

(65) Prior Publication Data

US 2002/0159116 A1    Oct. 31, 2002

(30) Foreign Application Priority Data

Apr. 25, 2001 (JP) ............................ 2001-127433

(51) Int. Cl.
*H04J 14/00* (2006.01)

(52) U.S. Cl. ............................. 398/49; 398/48; 398/51; 398/52

(58) Field of Classification Search ............ 398/45–50, 398/66, 76, 153, 160, 168
See application file for complete search history.

(56) References Cited

U.S. PATENT DOCUMENTS

| | | | | |
|---|---|---|---|---|
| 5,457,562 A | * | 10/1995 | Tremblay | .................... 398/70 |
| 5,909,294 A | | 6/1999 | Doerr et al. | |
| 5,938,309 A | * | 8/1999 | Taylor | ........................ 398/79 |
| 6,282,005 B1 | * | 8/2001 | Thompson et al. | ......... 398/143 |
| 6,486,989 B1 | * | 11/2002 | Shinoda | ...................... 398/79 |
| 6,650,840 B1 | * | 11/2003 | Feldman | ...................... 398/21 |
| 6,687,036 B1 | * | 2/2004 | Riza | .......................... 359/204 |
| 2003/0025957 A1 | * | 2/2003 | Jayakumar | .................. 359/110 |

* cited by examiner

*Primary Examiner*—Dzung Tran
(74) *Attorney, Agent, or Firm*—Wenderoth, Lind & Ponack, L.L.P.

(57) ABSTRACT

An optical transmission system is provided with a broadband optical transmitter including a broadband light source and a broadband optical modulator, an optical filter, an optical modulator, a transmission path, a wavelength router, and an optical receiver. The broadband optical transmitter outputs a broadband optical signal to the optical filter. The optical filter uses a branch wavelength bandwidth of the wavelength router as a basis for transmittance therethrough, and outputs only an applicable optical signal to the optical amplifier. The wavelength router simultaneously distributes the optical signal coming via the transmission path to each corresponding output port. In optical receivers, the optical signals penetrated through the wavelength router are converted into electrical signals.

11 Claims, 8 Drawing Sheets

OPTICAL TRANSMISSION SYSTEM AND OPTICAL TRANSMITTER USED THEREIN

BACKGROUND OF THE INVENTION

1. Field of the Invention

The present invention relates to optical transmission systems and optical transmitters used therein and, more specifically, to an optical transmission system in which a broadband optical signal is optically amplified for simultaneous distribution to a plurality of output ports, and an optical transmitter used in the system.

2. Description of the Background Art

An optical transmission system of a conventional type optically amplifies a broadband optical signal for simultaneous distribution to a plurality of receivers. FIG. 8 is a block diagram showing the structure of such a conventional optical transmission system. Referring to FIG. 8, the conventional optical transmission system includes an optical transmitter 1, an optical amplifier 2, a transmission path 3, a wavelength router 4, and n (where n is a natural number) pieces of optical receivers $5_1$ to $5_n$.

In the optical transmission system, a broadband optical signal coming from a broadband light source and others is outputted from the optical transmitter 1 to the optical amplifier 2. The broadband optical signal is then amplified by the optical amplifier 2, and outputted to the transmission path 3. Here, the transmission path 3 is exemplified by an optical fiber and others, and transmits the optical signal amplified by the optical amplifier 2 to the wavelength router 4. The wavelength router 4 includes a plurality of output ports, and has a function of branching an incoming optical signal based on its wavelength, and from each corresponding output port provided thereto, outputs the resulting signals. Specifically, the wavelength router 4 applies wavelength branching to optical signals, and outputs the resulting optical signals from each corresponding output port. If the broadband optical signal is provided by the optical amplifier 2 via the transmission path 3, the wavelength router 4 simultaneously distributes the broadband optical signal to a plurality of output ports. The output ports of the wavelength router 4 are connected with n pieces of optical receivers $5_1$ to $5_n$, respectively, in which the optical signals penetrated through the wavelength router 4 are converted into electrical signals.

However, the conventional optical transmission system as above bears the following problems. That is, if incoming power from the optical transmitter 1 increases, an outgoing power from the optical amplifier 2 saturates, resulting in gain decrease. Accordingly, in the case that the output spectrum from the optical transmitter 1 is spreading over a wide wavelength bandwidth as above, the incoming power in the optical amplifier 2 becomes increased, so that gain acquisition in the optical amplifier 2 cannot be effectively done. Further, if the conventional optical system applies a technique of multiplexing a broadband optical signal with any other optical signal, the resulting output spectrum from the optical transmitter 1 spreads over the wide wavelength bandwidth. As a result, the output spectrum affects other multiplexing optical signals as does cover their wavelength bandwidths as well.

SUMMARY OF THE INVENTION

Therefore, an object of the present invention is to provide, in an optical transmission system in which a broadband optical signal is optically amplified for simultaneous distribution to a plurality of output ports, the structure enabling effective use of gain of an optical amplifier, and suppression of crosstalk even if any other optical signal is multiplexed with the broadband optical signal for use therein.

The present invention has the following features to attain the object above.

A first aspect of the present invention is an optical transmission system in which a transmitter outputs, after amplification, a broadband optical signal and a wavelength-multiplexed optical signal, and a plurality of receivers receive the broadband optical signal simultaneously distributed thereto, and the wavelength-multiplexed optical signal after wavelength branching applied thereto based on the wavelength thereof, the transmitter comprising:

a broadband optical transmitter for outputting a broadband optical signal;

an optical filter using a predetermined wavelength bandwidth as a basis for passing through the broadband optical signal outputted from the broadband optical transmitter, and passing only a predetermined wavelength bandwidth optical signal which has been passed therethrough;

a wavelength multiplexing optical transmitter for outputting a wavelength-multiplexed optical signal to which a plurality of optical signals whose wavelengths are different from the predetermined wavelength bandwidth for transmittance through the optical filter are multiplexed; and a coupler for coupling the predetermined wavelength bandwidth optical signal passed through the optical filter with the wavelength-multiplexed optical signal outputted from the wavelength multiplexing optical transmitter, and the optical transmission system comprising:

an optical amplifier for amplifying the predetermined wavelength bandwidth optical signal and the wavelength-multiplexed optical signal coupled by the coupler, and outputting the coupled signal to the receivers; and a wavelength router, including a plurality of output ports, for applying wavelength branching to the amplified optical signal, and outputting branched optical signals from the output ports depending on the wavelengths of the branched optical signals, wherein the wavelength router distributes the predetermined wavelength bandwidth optical signal simultaneously to each of the output ports, and outputs optical signals obtained by branching the wavelength-multiplexed optical signal based on the wavelength thereof to the corresponding output ports.

As described above, in the first aspect, such an optical filter is inserted after the broadband optical transmitter to extract from a broadband optical signal only an optical signal of a predetermined wavelength bandwidth. This successfully reduces incoming power to the optical amplifier, leading to effective use of gain of the optical amplifier.

Such a wavelength router as above branches the amplified optical signal outputted from the transmitter, and based on a wavelength each uniquely assigned to the output ports, outputs branched optical signals to the corresponding output ports, and has a periodic branching characteristic with which the amplified optical signal is branched, separately from the uniquely-assigned wavelengths, based on a periodic wavelength which appears at a periodic interval with respect to each of the uniquely-assigned wavelengths for output to the output ports. As an example, the wavelength of the predetermined wavelength bandwidth optical signal passed through the optical filter at least includes the periodic wavelengths corresponding to the output ports, but does not include the uniquely-assigned wavelengths, and the wavelength of the wavelength-multiplexed optical signal transmitted from the wavelength multiplexing optical transmitter is selected from the uniquely-assigned wavelengths. In such a manner, the wavelength router applies wavelength branching to the wavelength-multiplexed optical signal based on the wavelengths each uniquely assigned to the output ports, and the resulting optical signals are outputted from each corresponding output port. The predetermined wavelength bandwidth optical signal is simultaneously outputted to all of the output ports depending on the periodic wavelength appearing at a periodic interval with respect to the uniquely-assigned wavelengths. Further, the wavelength bandwidth used as a basis for transmittance through the optical filter includes the periodic wavelengths but not the uniquely-assigned wavelengths, thereby successfully avoiding any affects that can be caused by the predetermined wavelength bandwidth optical signal and the wavelength-multiplexed optical signal, such as crosstalk and others. Here, the wavelength bandwidth of the predetermined wavelength bandwidth optical signal passed through the optical filter may include only a cycle of the periodic wavelengths. If this is the case, incoming power to the optical amplifier can be minimized, leading to more effective use of gain of the optical amplifier.

As another example, the wavelength bandwidth of the predetermined wavelength bandwidth optical signal passed through the optical filter at least includes the uniquely-assigned wavelengths, but does not include the periodic wavelengths corresponding to the output ports, and the wavelength of the wavelength-multiplexed optical signal transmitted from the wavelength multiplexing optical transmitter is selected from the periodic wavelengths. In such a manner, the wavelength router simultaneously distributes the predetermined wavelength bandwidth optical signal to all of the output ports depending on the wavelengths each uniquely assigned thereto. As to the wavelength-multiplexed optical signal, wavelength branching is applied thereto based on the periodic wavelengths each appear with respect to the uniquely-assigned wavelengths at aperiodic interval, and the resulting optical signals are outputted from each corresponding output port. Further, the wavelength bandwidth used as a basis for transmittance through the optical filter includes the uniquely-assigned wavelengths but not the periodic wavelengths, thereby successfully avoiding any affects that can be caused by the predetermined wavelength bandwidth optical signal and the wavelength-multiplexed optical signal, such as crosstalk and others.

Preferably, the wavelength-multiplexed optical signal is a data signal desired to be received by the receivers, and the predetermined wavelength bandwidth optical signal is a clock signal indicating timing information corresponding to the data signal. In this manner, the clock signal indicating the timing information can be distributed from all of the output ports of the wavelength router.

As an example, the wavelength multiplexing optical transmitter performs, in time series, wavelength switching with respect to optical signals included in the wavelength-multiplexed optical signal for output. In this manner, the wavelength-multiplexed optical signal can be outputted, in time series, only to any corresponding output port. As another example, the wavelength multiplexing optical transmitter simultaneously outputs the plurality of optical signals varying in wavelength included in the wavelength-multiplexed optical signal. In this manner, the wavelength-multiplexed optical signal can be simultaneously outputted to a plurality of output ports.

Preferably, the receivers each further include an optical reception section in which the branched optical signals outputted from the output ports are converted into electrical signals. With such a structure, the resulting electrical signals converted from the optical signal coming from the transmitter can be utilized for various purposes.

A second aspect of the present invention is directed to an optical transmission system in which a transmitter outputs, after amplification, a broadband optical signal, and a plurality of receivers receive the broadband optical signal simultaneously distributed thereto, the transmitter comprising:

a broadband optical transmitter for outputting a broadband optical signal; and an optical filter using a predetermined wavelength bandwidth as a basis for passing through the broadband optical signal outputted from the broadband optical transmitter, and passing only a predetermined wavelength bandwidth optical signal which has been passed therethrough, and the optical transmission system comprising:

an optical amplifier for amplifying the predetermined wavelength bandwidth optical signal passed through the optical filter, and outputting the amplified optical signal to the receivers; and a wavelength router, including a plurality of output ports, for applying wavelength branching to the amplified optical signal based on the wavelength thereof, and outputting branched optical signals from the output ports depending on the wavelengths of the branched optical signals, wherein the wavelength router distributes the predetermined wavelength bandwidth optical signal simultaneously to each of the output ports.

As described above, in the second aspect, such an optical filter is inserted after the broadband optical transmitter to extract from a broadband optical signal only an optical signal of a predetermined wavelength bandwidth. This successfully reduces incoming power to the optical amplifier, leading to effective use of gain of the optical amplifier.

Such a wavelength router as above branches the amplified optical signal outputted from the transmitter, and based on a wavelength each uniquely assigned to the output ports, outputs branched optical signals to the corresponding output ports, and has a periodic branching characteristic with which the amplified optical signal is branched, separately from the uniquely-assigned wavelengths, based on a periodic wavelength which appears at a periodic interval with respect to each of the uniquely-assigned wavelengths for output to the output ports. As an example, the wavelength bandwidth of the predetermined wavelength bandwidth optical signal passed through the optical filter at least includes the uniquely-assigned wavelengths, but does not include the periodic wavelengths corresponding to the output ports. In such a manner, the wavelength router outputs the predetermined wavelength bandwidth optical signal simultaneously to all of the output ports depending on the wavelengths each uniquely assigned thereto, but the optical signals corresponding to the periodic wavelengths appearing at a periodic interval with respect to the uniquely-assigned wavelengths are not always outputted to all of the output ports. As a result, the output ports of the wavelength router do not output such optical signals as a result of wavelength branching based on the periodic wavelengths, thereby successfully avoiding any affects that can be caused by optical signals of periodic wavelengths, such as crosstalk and others.

As another example, the wavelength bandwidth of the predetermined wavelength bandwidth optical signal passed through the optical filter at least includes the periodic wavelengths corresponding to the output ports, but does not include the uniquely-assigned wavelengths. In such a manner, the wavelength router outputs the predetermined wavelength bandwidth optical signal simultaneously to all of the output ports depending on the periodic wavelengths each appears at a periodic interval with respect to the uniquely-assigned wavelengths, but the optical signals corresponding to the uniquely-assigned wavelengths are not always outputted to all of the output ports. As a result, the output ports of the wavelength router do not output such optical signals as a result of wavelength branching based on the uniquely-assigned wavelengths, thereby successfully avoiding any affects that can be caused by optical signals of uniquely-assigned wavelengths, such as crosstalk and others.

Preferably, the receivers each further include an optical reception section in which the branched optical signals outputted from the output ports are converted into electrical signals by means of connection between the receivers and the output ports.

A third aspect of the present invention is directed to an optical transmission system in which a transmitter outputs, after amplification, a broadband optical signal, and a plurality of receivers receive the broadband optical signal simultaneously distributed thereto, the transmitter comprising:

a first broadband optical transmitter for outputting a first broadband optical signal;

a first optical filter using a predetermined wavelength bandwidth as a basis for passing through the first broadband optical signal outputted from the first broadband optical transmitter, and passing only a first predetermined wavelength bandwidth optical signal which has been passed therethrough;

a second broadband optical transmitter for outputting a second broadband optical signal;

a second optical filter using another predetermined wavelength bandwidth as a basis for passing through the second broadband optical signal outputted from the second broadband optical transmitter, and passing only a second predetermined wavelength bandwidth optical signal which has been passed therethrough; and a coupler for coupling together the first and second predetermined wavelength bandwidth optical signals passed through, respectively, the first and second optical filters, and
the optical transmission system comprising:

an optical amplifier for amplifying the first and second predetermined wavelength bandwidth optical signals coupled by the coupler, and outputting the coupled signal to the receivers; and a wavelength router, including a plurality of output ports, for applying wavelength branching to the amplified optical signal outputted from the transmitter, and based on a wavelength each uniquely assigned to the output ports, outputs branched optical signals to the corresponding output ports, wherein the wavelength router has a periodic branching characteristic with which the amplified optical signal is branched, separately from the uniquely-assigned wavelengths, based on a periodic wavelength which appears at a periodic interval with respect to each of the uniquely-assigned wavelengths for output to the output ports, the wavelength bandwidth of the first predetermined wavelength bandwidth optical signal passed through the first optical filter includes the periodic wavelengths at least corresponding to the output ports, but does not include the uniquely-assigned wavelengths, the wavelength bandwidth of the second predetermined wavelength bandwidth optical signal passed through the second optical filter at least include the uniquely-assigned wavelengths corresponding to the output ports, but does not include the periodic wavelengths, and the wavelength router distributes the first and second predetermined wavelength bandwidth optical signals simultaneously to each of the output ports.

As described above, in the third aspect, such first and second optical filters are inserted, respectively, after the first and second broadband optical transmitters to extract from a broadband optical signal only an optical signal of a predetermined wavelength bandwidth. This successfully reduces incoming power to the optical amplifier, leading to effective use of gain of the optical amplifier. Further, the wavelength router outputs the second predetermined wavelength bandwidth optical signal from all of the output ports depending on the wavelengths each uniquely assigned thereto, and outputs the first predetermined wavelength bandwidth optical signal from all of the output ports depending on the periodic wavelengths appearing with respect to the uniquely-assigned wavelengths at a periodic interval. The wavelength bandwidth used as a basis for transmittance through the first optical filter includes the periodic wavelengths, but not the uniquely-assigned wavelengths. On the other hand, the wavelength bandwidth used as a basis for transmittance through the second optical filter includes the uniquely-assigned wavelengths but not the periodic wavelengths. Therefore, this successfully avoids any affects that can be caused by the first and second predetermined wavelength signals, such as crosstalk and others.

A fourth aspect of the present invention is directed to an optical transmitter for transmitting, after amplification, a broadband optical signal, the optical transmitter comprising:

a broadband optical transmitter for outputting a broadband optical signal;

an optical filter using a predetermined wavelength bandwidth as a basis for passing through the broadband optical signal outputted from the broadband optical transmitter, and passing only a predetermined wavelength bandwidth optical signal which has been passed therethrough;

a wavelength multiplexing optical transmitter for outputting a wavelength-multiplexed optical signal to which a plurality of optical signals whose wavelengths are different from the predetermined wavelength bandwidth for transmittance through the optical filter are multiplexed;

a coupler for coupling the predetermined wavelength bandwidth optical signal passed through the optical filter with the wavelength-multiplexed optical signal outputted from the wavelength multiplexing optical transmitter; and an optical amplifier for amplifying the predetermined wavelength bandwidth optical signal and the wavelength-multiplexed optical signal coupled by the coupler, and outputting the coupled signal to the receivers.

As described above, in the fourth aspect, such an optical filter is inserted after the broadband optical transmitter to extract from a broadband optical signal only an optical signal of a predetermined wavelength bandwidth. This successfully reduces incoming power to the optical amplifier, leading to effective use of gain of the optical amplifier.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
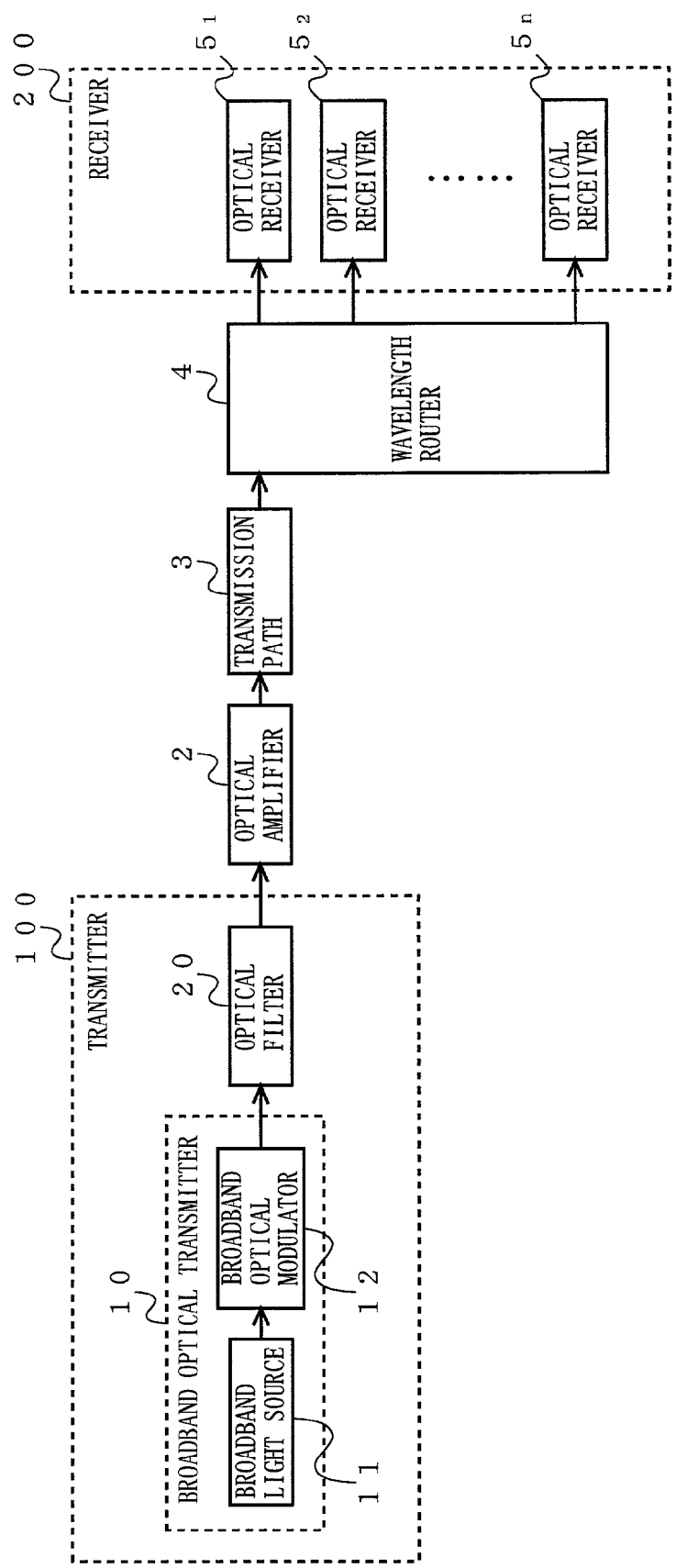
FIG. 1 is a block diagram showing the structure of an optical transmission system according to a first embodiment of the present invention.

Referring to FIG. 1, described below is an optical transmission system according to a first embodiment of the present invention. FIG. 1 is a block diagram showing the structure of the optical transmission system. In FIG. 1, the optical transmission system includes a transmitter 100 and a receiver 200 connected with each other via an optical amplifier 2, a transmission path 3, and a wavelength router 4. The transmitter 100 includes a broadband optical transmitter 10, and an optical filter 20. The broadband optical transmitter 10 is provided with a broadband light source 11, and a broadband optical modulator 12. The receiver 200 is provided with n (where n is a natural number) pieces of optical receivers $5_1$ to $5_n$. Herein, any component block identical to that of the Background Art section is under the same reference numeral.

In the broadband optical transmitter 10 of the transmitter 100, the broadband light source 11 outputs broadband light to the broadband optical modulator 12. In the broadband optical modulator 12, the light provided by the broadband light source 11 is modulated to an optical signal for output to the optical filter 20. The broadband light source 11 is generally constructed by a Light Emitting Diode (LED), an Amplified Spontaneous Emission (ASE), or a Super Luminescence Diode (SLD). As to the broadband optical signal which is provided by the broadband optical transmitter 10, the optical filter 20 uses a predetermined wavelength bandwidth as a basis for transmittance therethrough, and only an applicable resulting optical signal, i.e., its wavelength bandwidth is corresponding to the predetermined wavelength bandwidth, is outputted to the optical amplifier 2. Here, the wavelength bandwidth used as a basis for transmittance through the optical filter 20 will be described in detail later.

Then, the optical amplifier 2 amplifies the optical signal of the predetermined wavelength bandwidth as a result of transmittance through the optical filter 20, and outputs the signal to the transmission path 3. That is, out of the broadband optical signal modulated by the broadband optical modulator 12, transmitted from the optical amplifier 2 to the transmission path 3 after amplification is only the optical signal whose wavelength bandwidth has been passed through the optical filter 20.

The transmission path 3 of the optical transmission system is exemplified by an optical fiber and others, and transmits the optical signal amplified by the optical amplifier 2 to the wavelength router 4.

The wavelength router 4 includes a plurality of output ports, and has a function of branching an incoming optical signal based on its wavelength, and from each corresponding output port provided thereto, outputs the resulting optical signals. Hereinafter, the output ports are referred to as branch channels ch. The wavelength router 4 is generally constructed by an Arrayed-Waveguide Grating (AWG). With such a structure, through wavelength branching applied to the optical signal coming via the transmission path 3, the wavelength router 4 simultaneously distributes the resulting optical signals to the branch channels ch based on branch wavelengths each assigned thereto. The branch wavelengths used by the wavelength router 4 as a basis for signal distribution will be described in detail later. The branch channels ch of the wavelength router 4 are connected with the receiver 200, i.e., n pieces of optical receivers $5_1$ to $5_n$, in which the optical signals provided by the wavelength router 4 are converted into electrical signals.

Figure 2:
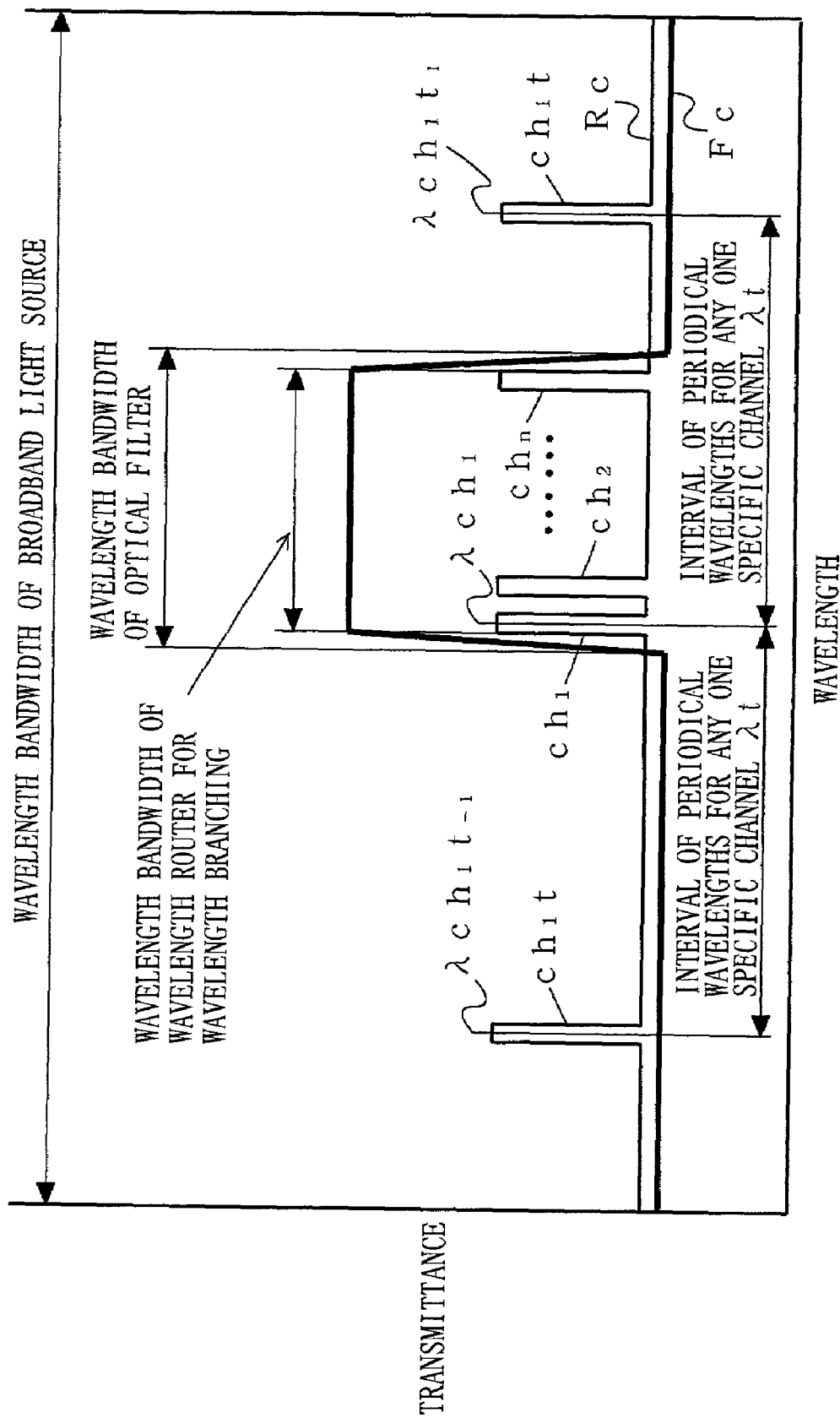
FIG. 2 is a schematic diagram showing wavelength characteristics of an optical filter 20 and a wavelength router 4 of FIG. 1.

Referring to FIG. 2, described next is the wavelength of an optical signal to be transmitted by the optical transmission system. Here, FIG. 2 is a schematic diagram showing a wavelength characteristic of a wavelength bandwidth transmittable through the optical filter 20, and a wavelength characteristic of a wavelength bandwidth covered by the wavelength router 4.

In FIG. 2, as described above, based on the wavelength of the received optical signal, the wavelength router 4 outputs the optical signals as a result of wavelength branching from the branch channels $ch_1$ to $ch_n$ to each corresponding optical receivers $5_1$ to $5_n$. This is depicted in FIG. 2 as a wavelength characteristic Rc as a result of branching by the wavelength router. In the below, the resulting various branch wavelengths respectively assigned to n pieces of branch channels $ch_1$ to $ch_n$ are referred to as branch channel wavelengths $\lambda\, ch_1$ to $\lambda\, ch_n$, and the wavelength bandwidth covering all of those branch channel wavelengths $\lambda\, ch_1$ to $\lambda\, ch_n$ is referred to as a branch wavelength bandwidth of the wavelength router 4. As to the optical filter 20, a wavelength bandwidth transmittable therethrough is so set as to be the same as or wider than the branch wavelength bandwidth of the wavelength router 4. This is depicted in FIG. 2 as a transmittance characteristic Fc of the optical filter 20. By setting the wavelength bandwidth transmittable through the optical filter 20 as such, the optical signal to be transmitted to the optical amplifier 2 is limited in wavelength bandwidth. This successfully decreases the incoming power of the optical signal, preventing the outgoing power of the optical amplifier 2 from saturating, and leading to effective gain acquisition. Moreover, as being the same as or wider than the branch wavelength bandwidth of the wavelength router 4, the wavelength bandwidth of the optical signal limited by the optical filter 20 does not affect the branch channel wavelengths $\lambda\, ch_1$ to $\lambda\, ch_n$ which are assigned, respectively, to n pieces of branch channels $ch_1$ to $ch_n$ of the wavelength router 4.

Generally, the wavelength router 4 has a function of branching an incoming optical signal based on also periodic wavelengths $\lambda\, cht$, which periodically appears with respect to the branch channel wavelengths λ ch assigned to the branch channels ch. That is, the branch channels ch receive, after wavelength branching by the wavelength router 4, not only optical signals of the branch channel wavelengths λ ch each assigned thereto but also optical signals of the periodic wavelengths λ cht. These periodic wavelengths λ cht are expressed by the following equation:

$$\lambda\ cht_m = \lambda ch + m*\lambda t$$

where λ t denotes a wavelength interval of the periodic wavelength λ cht periodically appearing to any one specific branch channel ch, and m is an integer not 0. As an example, with respect to the branch channel wavelength λ $ch_1$ assigned to the branch channel $ch_1$, the periodic wavelengths λ $ch_1 t_m$ appear on the long wavelength side as $$\lambda ch_1 t_1 = \lambda ch_1 + \lambda t$$

$$\lambda ch_1 t_2 = \lambda ch_1 + 2\lambda t$$

$$\lambda ch_1 t_3 = \lambda ch_1 + 3\lambda t \ldots, \text{ and}$$

on the short wavelength side, appear as $$\lambda ch_1 t_1 = \lambda ch_1 - \lambda t$$

$$\lambda ch_1 t_2 = \lambda ch_1 - 2\lambda t$$

$$\lambda ch_1 t_{-3} = \lambda ch_1 - 3\lambda t \ldots$$

Referring to FIG. 2 for the wavelength characteristic Rc as a result of branching by the wavelength router 4, the periodic wavelengths λ $ch_1$t to λ $ch_n$t are observed at the wavelength interval λ t on the basis of the branch channels $ch_1$ to $ch_n$ with respect to the corresponding branch channel wavelengths λ $ch_1$ to λ $ch_n$. For the sake of simplicity, FIG. 2 shows only the periodic wavelengths λ $ch_1 t_{-1}$ and λ $ch_1 t_1$ which appear at the wavelength interval λ t with respect to the branch channel wavelength λ $ch_1$ assigned to the branch channel $ch_1$. Here, the wavelength bandwidth transmittable through the optical filter 20 is so set as not to include the periodic wavelengths λ $ch_1$t to λ $ch_n$t of the wavelength router 4, that is, as to be narrower than the wavelength interval λ t for any one specific branch channel ch of the wavelength router 4. This is depicted in FIG. 2 as the transmittance characteristic Fc of the optical filter. By setting the wavelength bandwidth transmittable through the optical filter 20 as such, the optical receivers 5₁ to 5ₙ respectively connected to the branch channels $ch_1$ to $ch_n$ of the wavelength router 4 receive only optical signals of the branch channel wavelengths λ $ch_1$ to λ $ch_n$ assigned respectively to the branch channels $ch_1$ to $ch_n$. In other words, the optical receivers 5₁ to 5ₙ do not receive optical signals of the periodic wavelengths λ $ch_1$t to λ $ch_n$t, successfully avoiding any affects causable thereby, such as crosstalk.

As such, in the optical transmission system of the first embodiment, the wavelength bandwidth transmittable through the optical filter is so set as to be the same as or wider than the branch wavelength bandwidth of the wavelength router, and as not to include the periodic wavelengths of the wavelength router, i.e., as to be narrower than the wavelength interval for any one specific branch channel ch of the wavelength router. Such an optical filter is inserted after the optical transmitter to extract from a broadband optical signal only an optical signal of a required wavelength. This minimizes incoming power to the optical amplifier, leading to effective use of gain of the optical amplifier. Moreover, the optical receivers receive no such optical signals having the periodic wavelength periodically appearing to the branch channels of the wavelength router, successfully avoiding any affects that can be caused thereby, such as crosstalk.

In the present embodiment, the broadband optical modulator 12 is in charge of modulation using electrical signals. Alternatively, the broadband light source 11 may be directly modulated.

Second Embodiment

Figure 3:
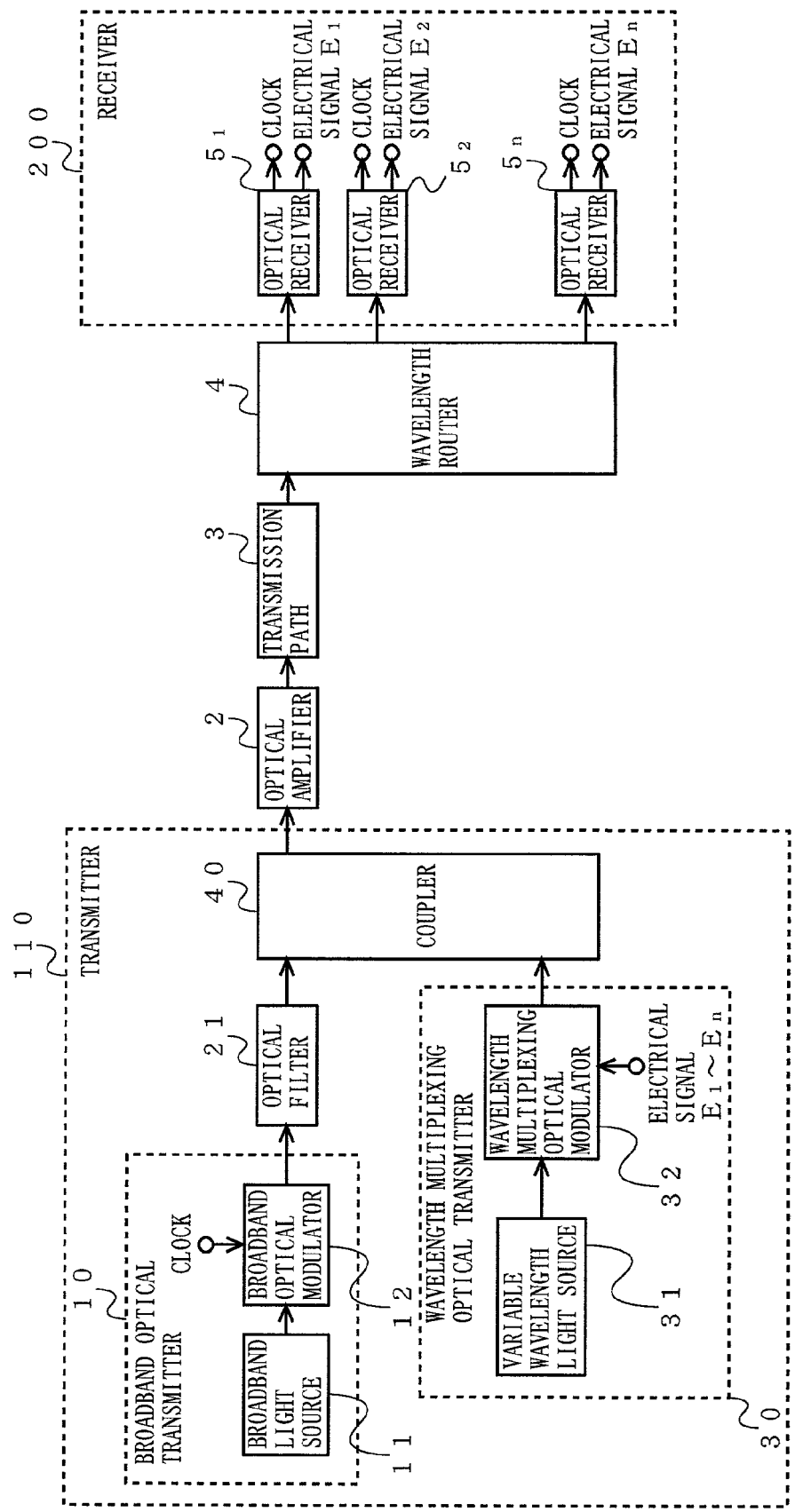
FIG. 3 is a block diagram showing the structure of an optical transmission system according to a second embodiment of the present invention.

Referring to FIG. 3, described below is an optical transmission system according to a second embodiment of the present invention. FIG. 3 is a block diagram showing the structure of the optical transmission system. In FIG. 3, compared with the optical transmission system of the first embodiment, i.e., specifically with the transmitter 100 thereof, a transmitter 110 further includes a wavelength multiplexing optical transmitter 30 and a coupler 40, and the wavelength bandwidth transmittable by an optical filter 21 therein is different from that by the optical filter 20. There is no other difference therebetween, and any component block identical to that of the first embodiment is provided with the same reference numeral, and not described again.

In the transmitter 110 of the optical transmission system, the wavelength multiplexing optical transmitter 30 includes a variable wavelength light source 31, and a wavelength multiplexing optical modulator 32. The variable wavelength light source 31 applies wavelength switching at a predetermined time interval to light varying in wavelength from λ $ch_1$ to λ $ch_n$, i.e., branch channel wavelengths λ $ch_1$ to λ $ch_n$ of the wavelength router 4, and outputs the result to the wavelength multiplexing optical modulator 32. The wavelength multiplexing optical modulator 32 modulates and multiplexes the light varying in wavelength from λ $ch_1$ to λ $ch_n$ provided by the variable wavelength light source 31 using any corresponding electrical signals $E_1$ to $E_n$, and outputs the resulting data optical signal to the coupler 40. Here, the coupler 40 is provided between the optical filter 21 and the optical amplifier 2, and couples the optical signals coming from both the optical filter 21 and the wavelength multiplexing optical modulator 32 for output to the optical amplifier 2.

Figure 4:
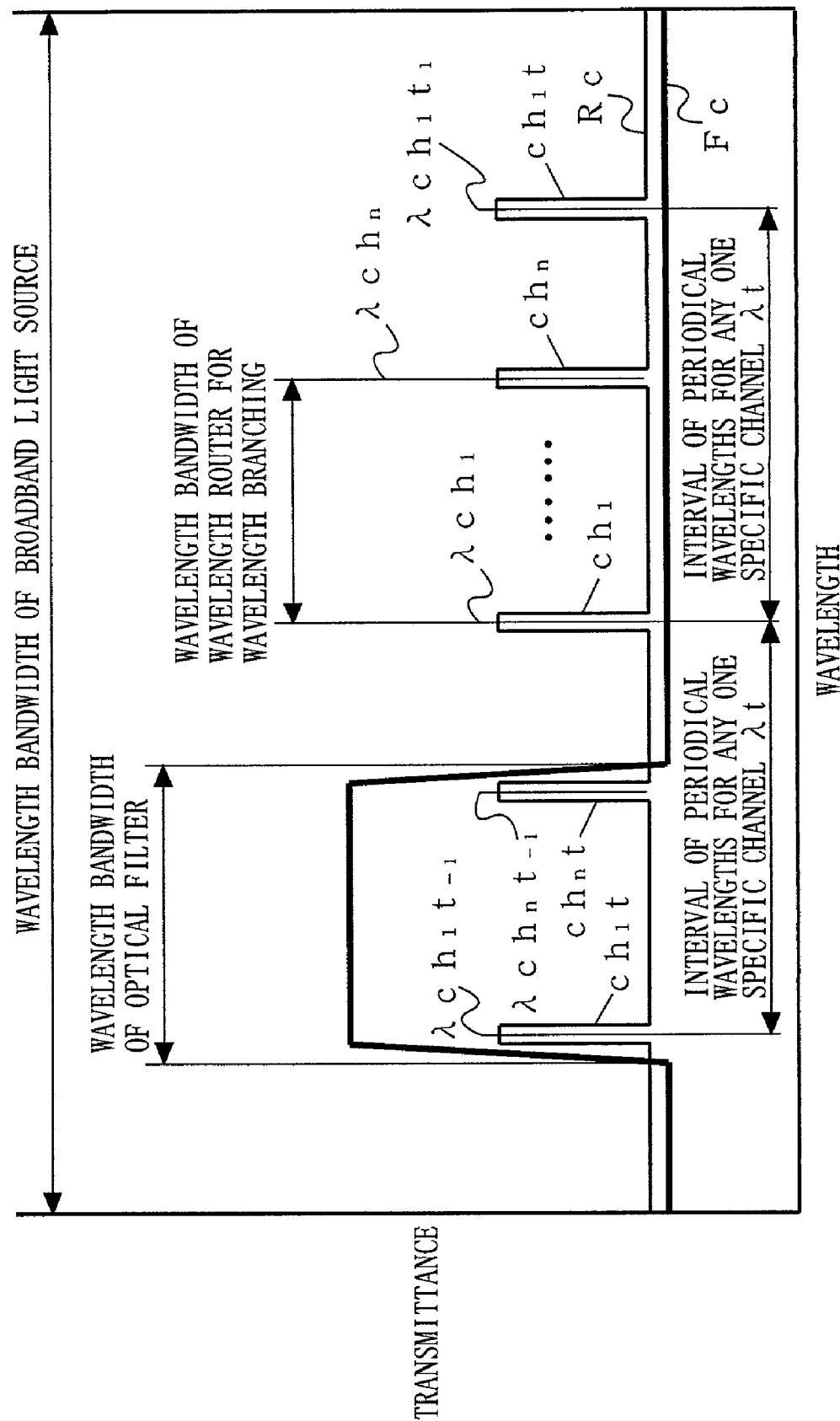
FIG. 4 is a schematic diagram showing wavelength characteristics of an optical filter 21 and a wavelength router 4 of FIG. 3.

As to the broadband optical signal provided by the broadband optical transmitter 10, the optical filter 21 uses a predetermined wavelength bandwidth as a basis for transmittance therethrough, and outputs only applicable resulting optical signal to the optical amplifier 2. Referring to FIG. 4, described next is the transmittance characteristic Fc of the optical filter 21.

In FIG. 4, as described above, based on the wavelength of the provided optical signal, the wavelength router 4 outputs the optical signals as a result of wavelength branching from the branch channels $ch_1$ to $ch_n$ to each corresponding optical receivers 5₁ to 5ₙ. This is depicted in FIG. 4 as a wavelength characteristic Rc as a result of branching by the wavelength router. The wavelength bandwidth covering all of those branch channel wavelengths λ $ch_1$ to λ $ch_n$ assigned to n pieces of branch channels $ch_1$ to $ch_n$ is referred to as a branch wavelength bandwidth of the wavelength router 4.

Here, as already described, the wavelength router 4 has a function of branching an incoming optical signal based also on a periodic wavelength λ cht, which periodically appears with respect to the branch channel wavelengths λ ch assigned to the branch channels ch.

Referring to FIG. 4 for the wavelength characteristic Rc as a result of branching by the wavelength router 4, the periodic wavelengths λ $ch_1$t to λ $ch_n$t are observed at the wavelength interval λ t on the basis of the branch channels $ch_1$ to $ch_n$ with respect to the corresponding branch channel wavelengths λ $ch_1$ to λ $ch_n$. For the sake of simplicity, FIG. 4 shows only the periodic wavelengths λ $ch_1t_{-1}$ and λ $ch_1t_1$ which appear at the wavelength interval λ t with respect to the branch channel wavelength λ $ch_1$ assigned to the branch channel $ch_1$, and the periodic wavelength λ $ch_nt_{-1}$ which appear also at the wavelength interval λ t with respect to the branch channel wavelength λ $ch_n$ assigned to the branch channel $ch_n$.

The wavelength bandwidth transmittable through the optical filter 21 is so set as to include a cycle of the periodic wavelengths λ $ch_1$t to λ $ch_n$t appearing at the wavelength interval λ t on the basis of the branch channels ch. In the transmittable characteristic Fc of the optical filter 21 in the FIG. 4 example, the periodic wavelengths λ $ch_1t_{-1}$ to λ $ch_nt_{-1}$ are included as a cycle on the short wavelength side with respect to the branch wavelength bandwidth of the wavelength router 4. Here, the wavelength bandwidth transmittable through the optical filter 21 is so set as not to include such a branch wavelength bandwidth of the wavelength router 4. More specifically, the wavelength bandwidth transmittable through the optical filter 21 is so set as to at least include a cycle of the periodic wavelengths λ $ch_1$t to λ $ch_n$t of the wavelength router 4 but not the branch wavelength bandwidth thereof. Here, the FIG. 4 example shows the wavelength bandwidth transmittable through the optical filter 21 as including a cycle of the periodic wavelengths λ $ch_1t_{-1}$ to λ $ch_nt_{-1}$ on the short wavelength side. Alternatively, a cycle of the periodic wavelengths λ $ch_1t_1$ to λ $ch_nt_1$ may be included on the long wavelength side, or a second cycle of the periodic wavelengths λ $ch_1t_{-2}$ to λ $ch_nt_{-2}$ may be an option, for example.

Here, as being so set as to include a cycle of the periodic wavelengths λ $ch_1$t to λ $ch_n$t of the wavelength router 4, the wavelength bandwidth transmittable through the optical filter 21 consequently is the same as or wider than the branch wavelength bandwidth of the wavelength router 4. This is depicted in FIG. 4 as the transmittance characteristic Fc of the optical filter. By setting the wavelength bandwidth transmittable through the optical filter 21 as such, the optical signal to be outputted to the optical amplifier 2 is limited in wavelength bandwidth. This successfully decreases the incoming power of the optical signal, preventing the outgoing power of the optical amplifier 2 from saturating, and leading to effective gain acquisition.

Described next is the operation of the optical transmission system of the second embodiment for transmitting optical signals. Referring back to FIG. 3, in the transmitter 110 of the optical transmission system, the broadband light source 11 of the broadband optical transmitter 10 outputs broadband light to the broadband optical modulator 12. The broadband optical modulator 12 modulates the light provided by the broadband light source 11 exemplarily using a clock signal, and then transmits the resulting clock light to the optical filter 21. As described above, out of the broadband clock light provided by the broadband optical modulator 12, transmittable through the optical filter 21 is only the clock light at least including a cycle of the periodic wavelengths λ$ch_1$t to λ $ch_n$t of the wavelength router 4 but not including the branch wavelength bandwidth thereof. The resulting clock light is then transmitted to the coupler 40.

The wavelength multiplexing optical transmitter 30 modulates and multiplexes light of wavelengths λ $ch_1$ to λ $ch_n$ using any corresponding electrical signals $E_1$ to $E_n$, and outputs the resulting optical signal at a predetermined time interval. Here, the wavelength multiplexing optical transmitter 30 multiplexes the optical signal with the branch channel wavelengths λ $ch_1$ to λ $ch_n$ depending on which of the optical receivers $5_1$ to $5_n$ is the desired target destination. To be specific, if the target destination is the optical receiver 51 connected to the branch channel $ch_1$ of the wavelength router 4, and if the electrical signal $E_1$ is desired to be transmitted thereto, the variable wavelength light source 31 outputs the light of the wavelength λ $ch_1$, the wavelength multiplexing optical modulator 32 modulates the light using the electrical signal $E_1$, and then the resulting optical signal is outputted to the coupler 40.

In the coupler 40, the clock light coming from the optical filter 21 and the optical signal coming from the wavelength multiplexing optical transmitter 30 are coupled together. In the optical amplifier 2, the resulting coupled signal provided by the wavelength multiplexing optical transmitter 30 is amplified and transmitted to the transmission path 3. That is, out of the broadband clock light modulated by the broadband optical modulator 12, transmitted from the transmitter 110 to the transmission path 3 after amplification by the optical amplifier 2, is the clock light whose wavelength bandwidth has been passed through the optical filter 21, and the optical signal of the branch channel wavelength λ ch assigned to the target optical receiver 5 desired by the wavelength multiplexing optical transmitter 30 for transmission.

The transmission path 3 of the optical transmission system is exemplified by an optical fiber and others, and transmits the clock light and the optical signal amplified by the optical amplifier 2 to the wavelength router 4.

As described in the foregoing, the wavelength router 4 has a function of branching an incoming optical signal based on its wavelength, and outputs the resulting optical signals from the corresponding branch channels ch. That is, as to the optical signal provided via the transmission path 3, after branching, the wavelength router 4 outputs the resulting optical signals from the branch channels $ch_1$ to $ch_n$ based on the branch channel wavelengths λ $ch_1$ to λ $ch_n$ assigned thereto. Further, as to the clock light also provided via the transmission path 3, the wavelength router 4 simultaneously distributes the clock light based on the wavelength thereof to the corresponding branch channels $ch_1$ to $ch_n$ for output therefrom. Moreover, the wavelength router 4 has a function of branching an incoming optical signal based also on a periodic wavelength λ cht, which periodically appears with respect to the branch channel wavelengths λ ch assigned to the branch channels ch. That is, the branch channels ch receive not only optical signals of the branch channel wavelengths λ ch each assigned thereto but also optical signals of the periodic wavelengths λ cht. Accordingly, the wavelength router 4 simultaneously distributes, branches, and outputs the clock light and the optical signal coming via the transmission path 3 to each corresponding branch channel ch based on the branch channel wavelengths λ $ch_1$ to λ $ch_n$ and the periodic wavelengths λ $ch_1$t to λ $ch_n$t. That is, the wavelength router 4 outputs the optical signals as a result of wavelength branching from the branch channels ch based on the wavelengths of the optical signals, and simultaneously distributes the clock light based on the wavelength thereof to the branch channels $ch_1$ to $ch_n$ for output therefrom. As such, the resulting clock signal and the optical signals are outputted to the branch channel ch.

The wavelength router 4 includes a plurality of branch channels $ch_1$ to $ch_n$, to which n pieces of optical receivers $5_1$ to $5_n$ are connected, respectively. In the optical receivers $5_1$ to $5_n$, the clock light and the optical signals as a result of wavelength branching by the wavelength router 4 are each converted into the clock signal and the electrical signals $E_1$ to $E_n$.

Figure 5:
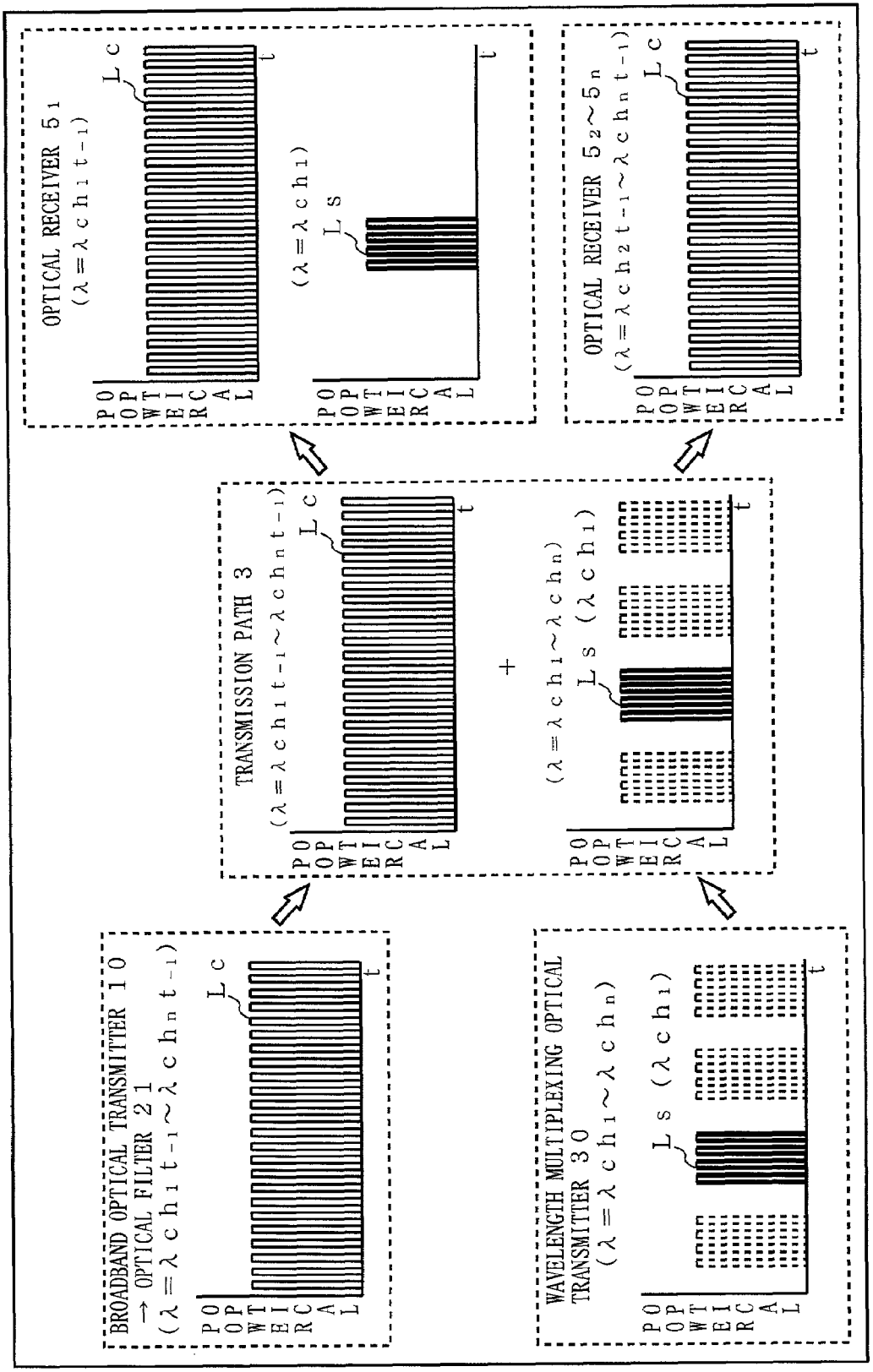
FIG. 5 is a schematic diagram showing the state, in each component block, of clock light and an optical signal to be transmitted in the optical transmission system of FIG. 3.

Referring to FIG. 5, described now are the clock light and the optical signal to be transmitted by the optical transmission system. Here, FIG. 5 shows schematic diagrams demonstrating the state of the transmitting clock light and optical signal in each constituent block. Here, the longitudinal axis indicates an optical power, while the lateral axis a time.

FIG. 5 example shows a case of transmitting the electrical signal $E_1$ to the optical receiver $5_1$ of the receiver 200 from the transmitter 110 to describe the clock light and the optical signal to be transmitted by the optical transmission system. As described above, out of the broadband clock light provided by the broadband optical transmitter 10, outputted to the coupler 40 is clock light Lc which has been passed through the optical filter 21. Typically, the clock light Lc is a signal alternating between 0 and 1. In this example, the wavelength bandwidth transmittable through the optical filter 21 includes a cycle of the periodic wavelengths $\lambda\ ch_1 t_{-1}$ to $\lambda\ ch_n t_{-1}$ on the short wavelength side of the branch wavelength bandwidth of the wavelength router 4. Therefore, outputted from the optical filter 21 is the clock light Lc of the wavelengths $\lambda\ ch_1 t_{-1}$ to $\lambda\ ch_n t_{-1}$.

In the wavelength multiplexing optical transmitter 30, the variable wavelength light source 31 outputs light of the wavelength $\lambda\ ch_1$. Then, the wavelength multiplexing optical modulator 32 modulates the light of the wavelength $\lambda\ ch_1$ using the electrical signal $E_1$, and outputs the resulting optical signal Ls to the coupler 40. FIG. 5 shows only the optical signal Ls of the wavelength $\lambda\ ch_1$ for the sake of simplicity, but actually the wavelength multiplexing optical modulator 32 is also transmitting optical signals of other wavelengths (optical signals indicated by broken lines in FIG. 5).

The clock light Lc and the optical signal Ls are coupled together by the coupler 40, amplified by the optical amplifier 2, and then transmitted through the transmission path 3. Specifically, the clock light Lc transmitted through the transmission path 3 is the one modulated by the clock signal, and the optical signal Ls is of the wavelength $\lambda\ ch_1$.

As to the clock light Lc provided via the transmission path 3, the wavelength router 4 simultaneously distributes to the clock light Lc based on the wavelength thereof to the corresponding branch channels $ch_1$ to $ch_n$ for output therefrom. As to the optical signal Ls provided via the transmission path 3, after branching, the wavelength router 4 outputs the resulting optical signals from the branch channels $ch_1$ to $ch_n$ based on the branch channel wavelengths $\lambda\ ch_1$ to $\lambda\ ch_n$ assigned thereto. The optical receiver 51 connected to the branch channel $ch_1$ receives the optical signal Ls of the branch channel wavelength $\lambda\ ch_1$ from the wavelength router 4. The branch channel $ch_1$ also receives the optical signal of the periodic wavelength $\lambda\ ch_1 t$ which periodically appears with respect to the branch channel wavelength $\lambda\ ch_1$ assigned to the branch channel $ch_1$. Here, as already described, the wavelength bandwidth transmittable through the optical filter 21 includes a cycle of the periodic wavelengths $\lambda\ ch_1 t_{-1}$ to $\lambda\ ch_n t_{-1}$ on the short wavelength side with respect to the branch wavelength bandwidth of the wavelength router 4. Accordingly, out of the clock light Lc of the periodic wavelength bandwidth, distributed to the optical receiver 51 is the clock light Lc of the periodic wavelength $\lambda\ ch_1 t_{-1}$. That is, the optical receiver 51 receives the clock light Lc of the periodic wavelength $\lambda\ ch_1 t_{-1}$ from the wavelength router 4, and also receives the optical signal Ls of the branch channel wavelength $\lambda\ ch_1$ therefrom.

On the other hand, the optical receivers $5_2$ to $5_n$ receives, after wavelength branching by the wavelength router 4, light of the branch channel wavelengths $\lambda\ ch_2$ to $\lambda\ ch_n$. The optical receivers $5_2$ to $5_n$ also receives, after wavelength branching by the wavelength router 4, optical signals of the periodic wavelengths $\lambda\ ch_2 t$ to $\lambda\ ch_n t$ which periodically appear with respect to the branch channel wavelength $\lambda\ ch_2$ to $\lambda\ ch_n$. Here, as described above, the wavelength bandwidth transmittable through the optical filter 21 includes a cycle of the periodic wavelengths $\lambda\ ch_1 t_{-1}$ to $\lambda\ ch_n t_{-1}$ on the short wavelength side with respect to the branch wavelength bandwidth of the wavelength router 4. Accordingly, out of the clock light Lc of the periodic wavelength bandwidth, distributed simultaneously to the optical receivers $5_2$ to $5_n$ is the clock light Lc of the periodic wavelengths $\lambda\ ch_2 t_{-1}$ to $\lambda\ ch_n t_{-1}$. Further, the optical signal Ls has the wavelength of $\lambda\ ch_1$ so that, as a result of wavelength branching by the wavelength router 4, the optical signal Ls does not go to the optical receivers $5_2$ to $5_n$. That is, the optical receivers $5_2$ to $5_n$ receive, simultaneously, only the clock light Lc of the periodic wavelengths $\lambda\ ch_2 t_{-1}$ to $\lambda\ ch_n t_{-1}$ for output therefrom. As such, the optical signal Ls provided by the transmitter 110 is distributed, through wavelength branching, to the branch channel $ch_1$ to $ch_n$ based on the branch channel wavelengths $\lambda\ ch_1$ to $\lambda\ ch_n$, while the clock light Lc is simultaneously distributed to all of the branch channels $ch_1$ to $ch_n$. Therefore, in FIG. 5 example, the optical receiver $5_1$ receives the optical signal Ls and the clock light Lc, while the optical receivers $5_2$ to $5_n$ receives only the clock light Lc.

As such, in the optical transmission system of the second embodiment, the wavelength bandwidth transmittable through the optical filter is so set as to include a cycle of the periodic wavelengths $\lambda\ ch_1 t$ to $\lambda\ ch_n t$ of the wavelength router of the receiver, and not to include the branch wavelength bandwidth thereof. Such an optical filter is inserted after the optical transmitter to extract from broadband clock light only clock light of a required wavelength. This minimizes incoming power to the optical amplifier, leading to effective use of gain of the optical amplifier. Moreover, the optical receivers receive optical signals of the branch channel wavelengths each correspondingly assigned to the output ports of the wavelength router, and the clock light of the periodic wavelength which periodically appears with respect to the branch channel wavelength, successfully avoids any affects that can be caused thereby, such as crosstalk.

In the second embodiment, described is the system in which clock light is transmitted by a periodic wavelength which periodically appears with respect to the branch channel wavelength of the wavelength router, and an optical signal is transmitted by the branch channel wavelength of the wavelength router. This is not restrictive, and the optical signal may be transmitted by the periodic wavelength which periodically appears with respect to the branch channel wavelength of the wavelength router, and the clock signal may be transmitted by the branch channel wavelength of the wavelength router.

In the present embodiment, the broadband optical modulator 12 is in charge of modulation using clock signals. Alternatively, the broadband light source 11 may be directly modulated. Similarly, the electrical signals $E_1$ to $E_n$ are modulated by the wavelength multiplexing optical modulator 32, but the variable wavelength light source 31 may be directly modulated.

Further, in the present embodiment, clock light is exemplified as a broadband optical signal. This is not restrictive, and the present invention is surely achievable by transmitting video data as a broadband optical signal, and a data signal corresponding to the optical receiver as a wavelength multiplexing optical signal. That is, the present invention becomes effectively applicable by transmitting data as a broadband optical signal to a plurality of optical receivers, and by transmitting a data signal as a wavelength multiplexing optical signal responding to a request coming from the optical receivers.

The variable wavelength light source 31 may output the light varying in wavelength to the wavelength multiplexing optical modulator 32. With such a structure, a plurality of receivers 5 can simultaneously receive optical signals multiplexed by a plurality of wavelengths. Further, the variable wavelength light source 31 may be constructed by a plurality of single-wavelength light source to realize the present invention.

Third Embodiment

Figure 6:
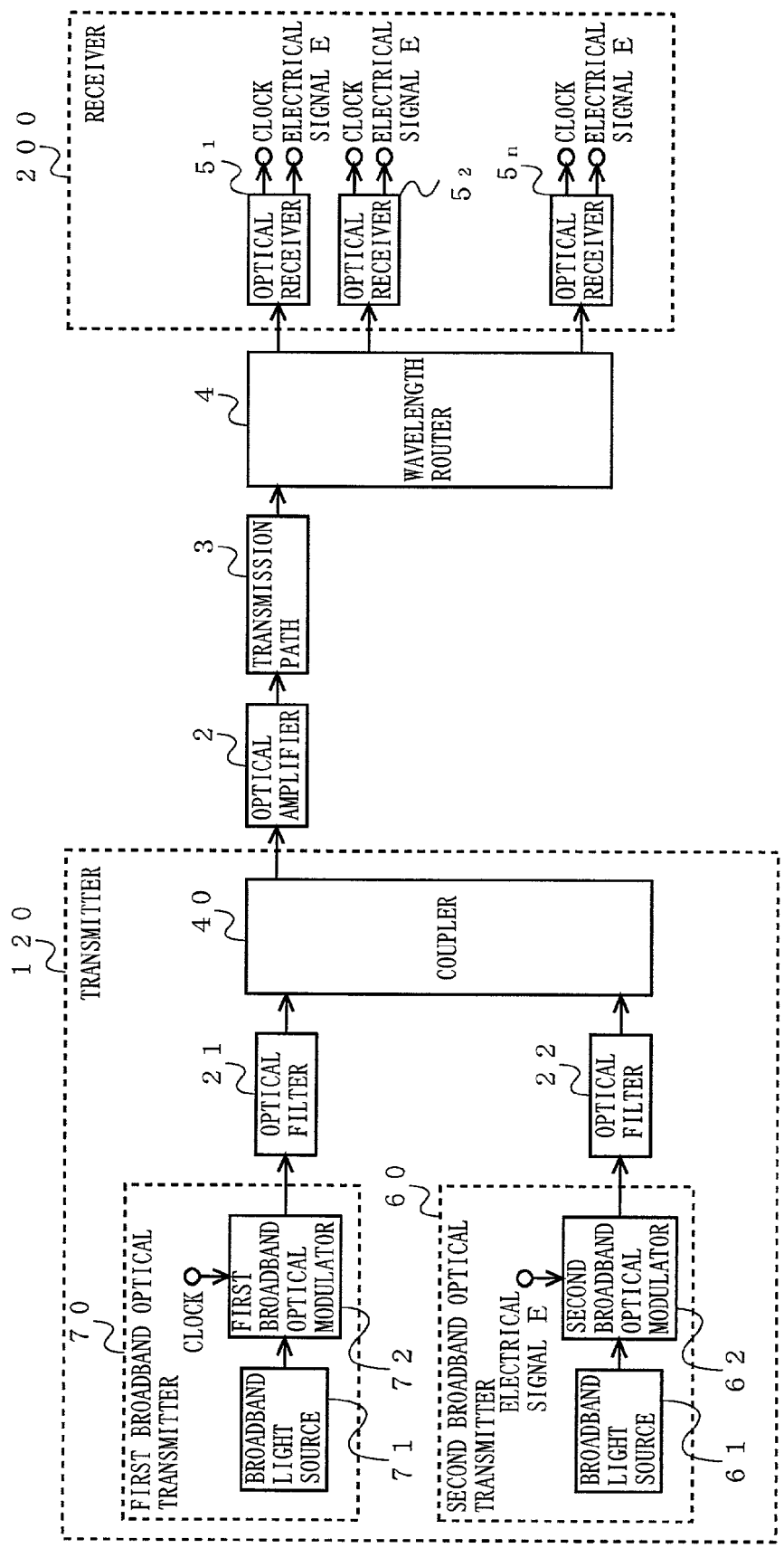
FIG. 6 is a block diagram showing the structure of an optical transmission system according to a third embodiment of the present invention.

Referring to FIG. 6, described next is an optical transmission system according to a third embodiment of the present invention. FIG. 6 is a block diagram showing the structure of the optical transmission system. In FIG. 6, compared with the optical transmission system of the second embodiment, i.e., specifically with the transmitter 110 thereof, a first broadband optical transmitter 70 is provided as an alternative to the broadband optical transmitter 10, and a second broadband optical transmitter 60 and an optical filter 22 are further provided. There is no other difference therebetween, and any component block identical to that of the second embodiment is provided with the same reference numeral, and not described again.

In the transmitter 120 of the optical transmission system, the first broadband optical transmitter 70 includes a broadband light source 71 and a first broadband optical modulator 72, which are the same as the broadband light source 11 and the broadband optical modulator 12. Therefore, no further description is given here. The second broadband optical transmitter 60 includes a broadband light source 61 and a second broadband optical modulator 62. Similarly to the broadband light source 11, the broadband light source 61 is constructed by LED, ASE, or SLD. The second broadband optical modulator 62 modulates the broadband light coming from the broadband light source 61 using an electrical signal E, and outputs the resulting data optical signal to the optical filter 22. The optical filter 22 is provided between the second broadband optical transmitter 60 and the coupler 40. The coupler 40 couples the optical signals coming from the optical filters 21 and 22 for output to the optical amplifier 2.

Figure 7:
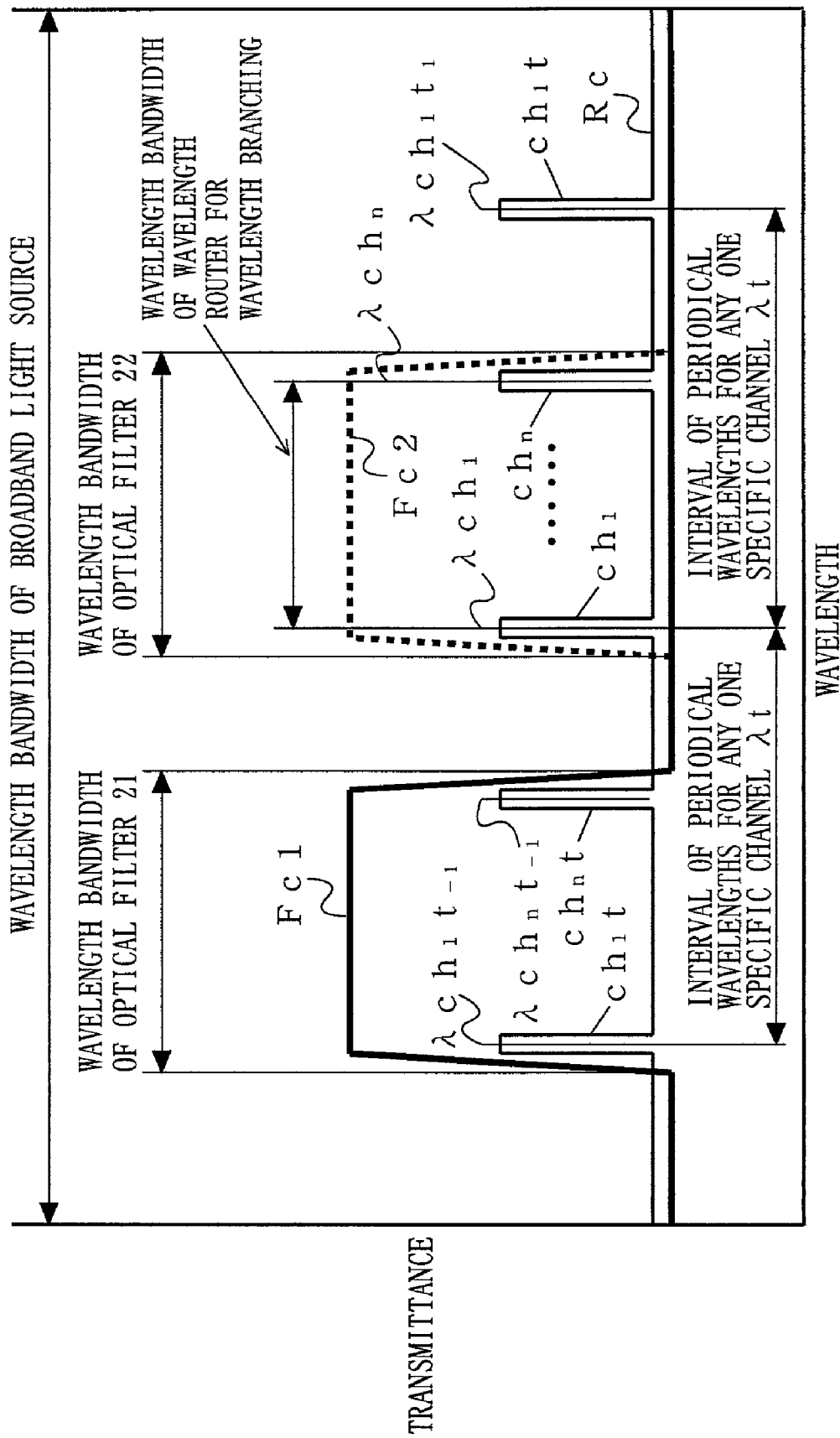
FIG. 7 is a schematic diagram showing wavelength characteristics of optical filters 21 and 22, and a wavelength router 4 of FIG. 6.
Figure 8:
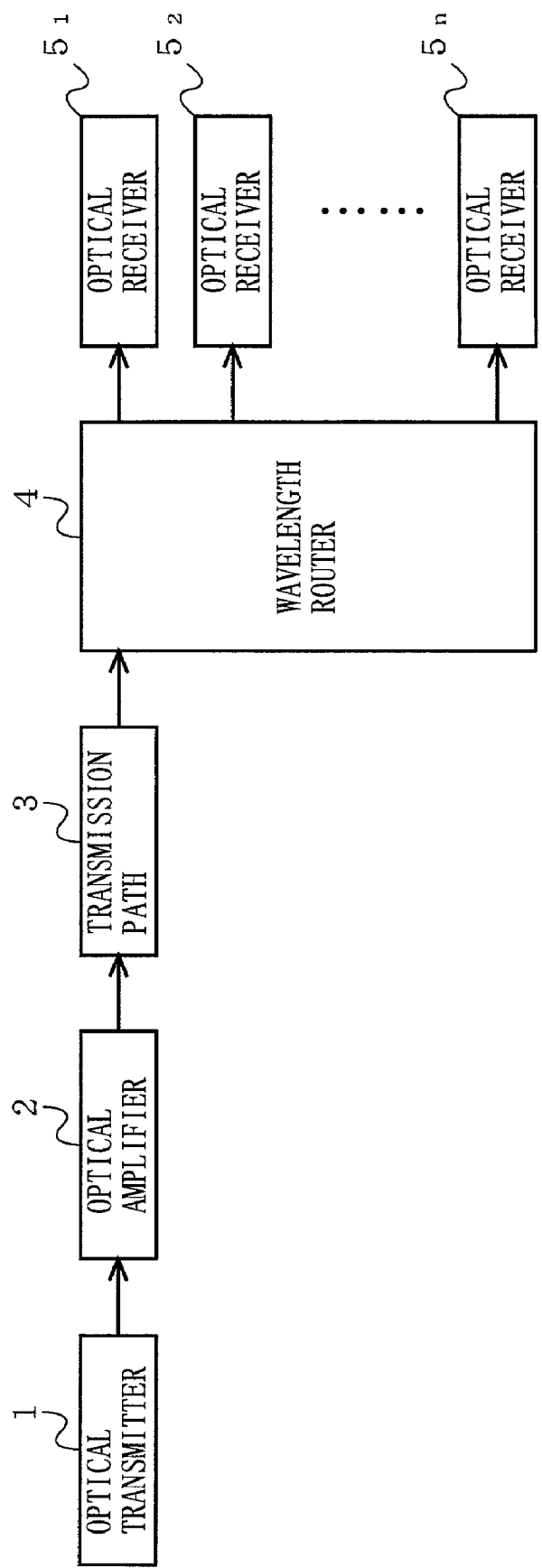
FIG. 8 is a block diagram showing the structure of a conventional optical transmission system.

As to the broadband optical signal provided by the second broadband optical transmitter 60, the optical filter 22 uses a predetermined wavelength bandwidth as a basis for transmittance therethrough, and only applicable resulting optical signal, i.e., its wavelength is corresponding to the predetermined wavelength bandwidth, is outputted to the optical amplifier 2. Referring to FIG. 7, described now is the transmittance characteristic Fc2 of the optical filter 22.

In FIG. 7, as described above, based on the branch channel wavelengths $\lambda$ $ch_1$ to $\lambda$ $ch_n$, the wavelength router 4 simultaneously outputs the optical signals as a result of wavelength branching from the branch channels $ch_1$ to $ch_n$ to each corresponding optical receivers $5_1$ to $5_n$. This is depicted in FIG. 7 as a wavelength characteristic Rc as a result of branching by the wavelength router. The wavelength bandwidth covering all of those branch channel wavelengths $\lambda$ $ch_1$ to $\lambda$ $ch_n$ assigned to n pieces of branch channels $ch_1$ to $ch_n$ is referred to as a branch wavelength bandwidth of the wavelength router 4.

Here, as already described, the wavelength router 4 has a function of branching an incoming optical signal based also on a periodic wavelength $\lambda$ cht, which periodically appears with respect to the branch channel wavelengths $\lambda$ ch assigned to the branch channels ch. That is, the branch channels ch receive, after wavelength branching by the wavelength router 4, not only optical signals of the branch channel wavelengths $\lambda$ ch each assigned thereto but also optical signals of the periodic wavelengths $\lambda$ cht.

Referring to FIG. 7 for the wavelength characteristic Rc as a result of branching by the wavelength router 4, the periodic wavelengths $\lambda$ $ch_1 t$ to $\lambda$ $ch_n t$ are observed at the wavelength interval $\lambda$ t on a branch channel ch basis with respect to the corresponding branch channel wavelength $\lambda$ $ch_1$ to $\lambda$ $ch_n$. For the sake of simplicity, FIG. 7 shows only the periodic wavelengths $\lambda$ $ch_1 t_{-1}$ and $\lambda$ $ch_1 t_1$ which appear at the wavelength interval $\lambda$ t with respect to the branch channel wavelength $\lambda$ $ch_1$ assigned to the branch channel $ch_1$, and the periodic wavelength $\lambda$ $ch_n t_{-1}$ which appears at the wavelength interval $\lambda$ t with respect to the branch channel wavelength $\lambda$ $ch_n$ assigned to the branch channel $ch_n$.

The wavelength bandwidth transmittable by the optical filter 21 is so set as to at least include a cycle of the periodic wavelengths $\lambda$ $ch_1 t$ to $\lambda$ $ch_n t$ of the wavelength router 4 but not the branch wavelength bandwidth thereof. Here, Referring to FIG. 7 for the transmittance characteristic Fc1 of the optical filter 21, the wavelength bandwidth transmittable by the optical filter 21 includes a cycle of the periodic wavelengths $\lambda$ $ch_1 t_{-1}$ to $\lambda$ $ch_n t_{-1}$ on the short wavelength side with respect to the branch wavelength bandwidth of the wavelength router 4. On the other hand, the wavelength bandwidth transmittable by the optical filter 22 is so set as to at least include the branch wavelength bandwidth $\lambda$ $ch_1$ to $\lambda$ $ch_n$ of the wavelength router 4, and not to include the periodic wavelengths $\lambda$ $ch_t$ to $\lambda$ $ch_n t$ thereof. That is, the wavelength bandwidth transmittable by the optical filter 21 is so set as to differ from that by the optical filter 22. To be more specific, the wavelength bandwidth transmittable by the optical filter 21 is so set as to include the periodic wavelengths $\lambda$ $ch_1 t$ to $\lambda$ $ch_n t$ of the wavelength router 4, while that by the optical filter 22 is so set as to include the branch channel wavelengths $\lambda$ $ch_1$ to $\lambda$ $ch_n$ thereof.

Here, the wavelength bandwidths transmittable through the optical filters 21 and 22 are both so set as to be the same as or wider than the wavelength bandwidth covered by the wavelength router 4. This is depicted in FIG. 7 as a transmittance characteristics Fc1 and Fc2 of the optical filter. By setting the wavelength bandwidths transmittable through the optical filters 21 and 22 as such, the optical signal to be outputted to the optical amplifier 2 is limited in wavelength bandwidth. This successfully decreases the incoming power of the optical signal, preventing the outgoing power of the optical amplifier 2 from saturating, and leading to effective gain acquisition.

Described next is the operation of the optical transmission system of the third embodiment for transmitting optical signals. Referring back to FIG. 6, in the transmitter 120 of the optical transmission system, the broadband light source 71 of the first broadband optical transmitter 70 transmits broadband light to the first broadband optical modulator 72. The first broadband optical modulator 72 modulates the light provided by the broadband light source 71 using a clock signal, and then transmits the resulting clock light to the optical filter 21. As described above, out of the broadband clock light provided by the first broadband optical modulator 72, transmittable through the optical filter 21 is only the clock light at least including a cycle of the periodic wavelengths $\lambda\, ch_1 t$ to $\lambda\, ch_n t$ of the wavelength router 4 but not including the branch wavelength bandwidth thereof. The resulting clock light is then transmitted to the coupler 40.

The second broadband optical transmitter 60 modulates the broadband light using the electrical signal E, and outputs the resulting optical signal to the optical filter 22. As described above, out of the broadband optical signal provided by the second broadband optical modulator 62, transmittable through the optical filter 22 is only the optical signal at least including the branch wavelength bandwidth $\lambda\, ch_1$ to $\lambda\, ch_n$ of the wavelength router 4 but not including the periodic wavelengths $\lambda\, ch_1 t$ to $\lambda\, ch_n t$ thereof. The resulting optical signal is then transmitted to the coupler 40.

The coupler 40 couples together the clock signal and the optical signal coming from the optical filters 21 and 22. The optical amplifier 2 amplifies the resulting coupled signal for transmission to the transmission path 3. That is, transmitted after amplification by the optical amplifier 2 from the transmitter 120 to the transmission path 3 is the clock light whose wavelength bandwidth has been passed through the optical filter 21 after modulation by the first broadband optical modulator 72, and the optical signal whose wavelength bandwidth has been passed through the optical filter after modulation by the second broadband optical transmitter 60 using the electrical signal E.

The transmission path 3 of the optical transmission system is exemplified by an optical fiber and others, and transmits the clock signal and the optical signal amplified by the optical amplifier 2 to the wavelength router 4.

The wavelength router 4 has a function of branching an incoming clock signal and optical signal based on the branch channel wavelengths $\lambda\, ch_1$ to $\lambda\, ch_n$, and from each corresponding branch channel ch provided thereto, simultaneously distributes the resulting clock light and optical signals. The wavelength router 4 has a function of branching an incoming optical signal based also on a periodic wavelength $\lambda$ cht, which periodically appears with respect to the branch channel wavelengths $\lambda$ ch assigned to the branch channels ch. That is, the branch channels ch receive, after wavelength branching by the wavelength router 4, not only optical signals of the branch channel wavelengths $\lambda$ ch each assigned thereto but also optical signals of the periodic wavelengths $\lambda$ cht. Therefore, as to the clock light provided via the transmission path 3, the wavelength router 4 branches the clock light of the periodic wavelengths $\lambda$ cht to $\lambda\, ch_n t$ so as to distribute the resulting clock light to each corresponding branch channel ch. As to the optical signal of the branch channel wavelengths of $\lambda\, ch_1$ to $\lambda\, ch_n$ provided via the transmission path 3, after branching, the wavelength router 4 simultaneously outputs the resulting optical signals from the branch channels $ch_1$ to $ch_n$ based on the branch channel wavelengths $\lambda\, ch_1$ to $\lambda\, ch_n$ assigned thereto. That is, from all of the branch channels ch of the wavelength router 4, outputted is the clock light from the first broadband optical transmitter 70, and the optical signal from the second broadband optical transmitter 60. Note here that, the clock light has the periodic wavelengths $\lambda\, ch_1 t$ to $\lambda ch_n t$, and the optical signal has the branch channel wavelengths $\lambda\, ch_1$ to $\lambda\, ch_n$. Therefore, the clock light and the optical signal are differed in wavelength from each other, successfully avoiding crosstalk and others.

The branch channels ch of the wavelength router 4 are connected with the receiver 200, i.e., n pieces of optical receivers $5_1$ to $5_n$, respectively, in which the resulting clock light and optical signals provided by the wavelength router 4 are converted into clock signals and electrical signals E.

As such, with the optical transmission system of the third embodiment, the wavelength bandwidth transmittable through the optical filter is so set as to include a cycle of the periodic wavelengths $\lambda\, ch_1 t$ to $\lambda\, ch_n t$ of the wavelength router 4 but not the branch wavelength bandwidth thereof. Further, the wavelength bandwidth transmittable through the optical filter is so set as to include the branch wavelength bandwidth of the wavelength router but not the periodic wavelengths $\lambda\, ch_1 t$ to $\lambda\, ch_n t$ thereof. Such an optical filter is inserted after each of the optical transmitters to extract from broadband clock light and a broadband optical signal only clock light and an optical signal of a required wavelength. This minimizes incoming power to the optical amplifier, leading to effective use of gain of the optical amplifier. Moreover, all of the output ports of the wavelength router receive the optical signal and the clock light differing in wavelength, successfully avoiding any affects that can be caused thereby, such as crosstalk.

In the present embodiment, the second broadband optical modulator 62 is in charge of modulation using electrical signals. Alternatively, the broadband light source 61 may be directly modulated.

Further, in the present embodiment, a clock light is exemplified as a broadband optical signal. This is not restrictive, and the present invention is surely achievable by transmitting video data as a broadband optical signal. That is, the present invention becomes effectively applicable by transmitting data as a broadband optical signal to a plurality of optical receivers.

While the invention has been described in detail, the foregoing description is in all aspects illustrative and not restrictive. It is understood that numerous other modifications and variations can be devised without departing from the scope of the invention.

What is claimed is:

1. An optical transmission system for transmitting a broadband optical signal and a wavelength-multiplexed optical signal, the optical transmission system comprising:
   a plurality of receivers;
   a transmitter comprising:
      a broadband optical transmitter for outputting the broadband optical signal;
      an optical filter for passing a predetermined wavelength bandwidth optical signal of the broadband optical signal output from said broadband optical transmitter based on a predetermined wavelength bandwidth;
      a wavelength multiplexing optical transmitter for outputting the wavelength-multiplexed optical signal including a plurality of optical signals having wavelengths that are different from the predetermined wavelength bandwidth of said optical filter; and
      a coupler for coupling the predetermined wavelength bandwidth optical signal passed through said optical filter with the wavelength-multiplexed optical signal outputted from said wavelength multiplexing optical transmitter;
   an optical amplifier for amplifying the predetermined wavelength bandwidth optical signal and the wavelength-multiplexed optical signal coupled by said coupler, and outputting an amplified optical signal; and
   a wavelength router, including a plurality of output ports, for wavelength branching the amplified optical signal, and outputting branched optical signals from said output ports to said receivers, respectively, depending on wavelengths of the branched optical signals, wherein said wavelength router distributes the predetermined wavelength bandwidth optical signal simultaneously to each of said output ports in the branched optical signals, and outputs optical signals obtained by branching the wavelength-multiplexed optical signal based on a wavelength thereof to corresponding output ports in the branched optical signals, outputs the branched optical signals to said corresponding output ports based on a wavelength uniquely assigned to each of said output ports, and has a periodic branching characteristic with which the amplified optical signal is branched, separate from the uniquely-assigned wavelengths, based on a periodic wavelength which appears at a periodic interval with respect to each of the uniquely-assigned wavelengths for output to said output ports, the wavelength bandwidth of the predetermined wavelength bandwidth optical signal passed through said optical filter at least includes the periodic wavelengths corresponding to said output ports and does not include the uniquely-assigned wavelengths, and the wavelength of the wavelength-multiplexed optical signal transmitted from said wavelength multiplexing optical transmitter is selected from the uniquely-assigned wavelengths.

2. The optical transmission system according to claim 1, wherein the wavelength bandwidth of the predetermined wavelength bandwidth optical signal passed through said optical filter includes only a cycle of the periodic wavelengths.

3. The optical transmission system according to claim 1 wherein the wavelength-multiplexed optical signal is a data signal to be received by said receivers, and the predetermined wavelength bandwidth optical signal is a clock signal indicating timing information corresponding to the data signal.

4. The optical transmission system according to claim 1 wherein said wavelength multiplexing optical transmitter performs, in time series, wavelength switching with respect to the optical signals included in the wavelength-multiplexed optical signal for output.

5. The optical transmission system according to claim 1 wherein said wavelength multiplexing optical transmitter simultaneously outputs the optical signals varying in wavelength included in the wavelength-multiplexed optical signal.

6. The optical transmission system according to claim 1, wherein said receivers each include an optical reception section, said optical reception sections for converting the branched optical signals outputted from said output ports into electrical signals.

7. An optical transmission system for transmitting a broadband optical signal and a wavelength-multiplexed optical signal, the optical transmission system comprising:

a plurality of receivers;

a transmitter comprising:

a broadband optical transmitter for outputting the broadband optical signal;

an optical filter for passing a predetermined wavelength bandwidth optical signal of the broadband optical signal output from said broadband optical transmitter based on a predetermined wavelength bandwidth;

a wavelength multiplexing optical transmitter for outputting the wavelength-multiplexed optical signal including a plurality of optical signals having wavelengths that are different from the predetermined wavelength bandwidth of said optical filter; and a coupler for coupling the predetermined wavelength bandwidth optical signal passed through said optical filter with the wavelength-multiplexed optical signal outputted from said wavelength multiplexing optical transmitter;

an optical amplifier for amplifying the predetermined wavelength bandwidth optical signal and the wavelength-multiplexed optical signal coupled by said coupler, and outputting an amplified optical signal; and a wavelength router, including a plurality of output ports, for wavelength branching the amplified optical signal, and outputting branched optical signals from said output ports to said receivers, respectively, depending on wavelengths of the branched optical signals, wherein said wavelength router distributes the predetermined wavelength bandwidth optical signal simultaneously to each of said output ports in the branched optical signals and outputs optical signals obtained by branching the wavelength-multiplexed optical signal based on a wavelength thereof to corresponding output ports in the branched optical signals, outputs the branched optical signals to said corresponding output ports based on a wavelength uniquely assigned to each of said output ports, and has a periodic branching characteristic with which the amplified optical signal is branched, separate from the uniquely-assigned wavelengths, based on a periodic wavelength which appears at a periodic interval with respect to each of the uniquely-assigned wavelengths for output to said output ports, the wavelength bandwidth of the predetermined wavelength bandwidth optical signal passed through said optical filter at least includes the uniquely-assigned wavelengths and does not include the periodic wavelengths corresponding to said output ports, and the wavelength of the wavelength-multiplexed optical signal transmitted from said wavelength multiplexing optical transmitter is selected from the periodic wavelengths.

8. An optical transmission system for transmitting a broadband optical signal, the optical transmission system comprising:

a plurality of receivers;

a transmitter comprising:

a broadband optical transmitter for outputting the broadband optical signal; and an optical filter for passing a predetermined wavelength bandwidth optical signal of the broadband optical signal output from said broadband optical transmitter based on a predetermined wavelength bandwidth;

an optical amplifier for amplifying the predetermined wavelength bandwidth optical signal passed through said optical filter, and outputting an amplified optical signal; and a wavelength router, including a plurality of output ports, for wavelength branching the amplified optical signal based on a wavelength thereof, and outputting branched optical signals from said output ports depending on wavelengths of the branched optical signals, wherein said wavelength router distributes the predetermined wavelength bandwidth optical signal simultaneously to each of said output ports in the branched optical signals, outputs the branched optical signals to corresponding output ports based on a wavelength uniquely assigned to each of said output ports, and has a periodic branching characteristic with which the amplified optical signal is branched, separate from the uniquely-assigned wavelengths, based on a periodic wavelength which appears at a periodic interval with respect to each of the uniquely-assigned wavelengths for output to said output ports, and the wavelength bandwidth of the predetermined wavelength bandwidth optical signal passed through said optical filter at least includes the uniquely-assigned wavelengths and does not include the periodic wavelengths corresponding to said output ports.

9. The optical transmission system according to claim 8, wherein said receivers each include an optical reception section, said optical reception sections for converting the branched optical signals outputted from said output ports into electrical signals.

10. An optical transmission system for transmitting a broadband optical signal, the optical transmission system comprising:

a plurality of receivers;

a transmitter comprising:

a broadband optical transmitter for outputting the broadband optical signal; and an optical filter for passing a predetermined wavelength bandwidth optical signal of the broadband optical signal output from said broadband optical transmitter based on a predetermined wavelength bandwidth;

an optical amplifier for amplifying the predetermined wavelength bandwidth optical signal passed through said optical filter, and outputting an amplified optical signal; and a wavelength router, including a plurality of output ports, for wavelength branching the amplified optical signal based on a wavelength thereof, and outputting branched optical signals from said output ports depending on wavelengths of the branched optical signals, wherein said wavelength router distributes the predetermined wavelength bandwidth optical signal simultaneously to each of said output ports in the branched optical signals, outputs the branched optical signals to corresponding output ports based on a wavelength uniquely assigned to each of said output ports, and has a periodic branching characteristic with which the amplified optical signal is branched, separate from the uniquely-assigned wavelengths, based on a periodic wavelength which appears at a periodic interval with respect to each of the uniquely-assigned wavelengths for output to said output ports, and the wavelength bandwidth of the predetermined wavelength bandwidth optical signal passed through said optical filter at least includes the periodic wavelengths corresponding to said output ports and does not include the uniquely-assigned wavelengths.

11. The optical transmission system according to claim 10, wherein said receivers each include an optical reception section, said optical reception sections for converting the branched optical signals outputted from said output ports into electrical signals.

* * * * *

UNITED STATES PATENT AND TRADEMARK OFFICE
CERTIFICATE OF CORRECTION

| | |
|---|---|
| PATENT NO. | : 7,164,858 B2 |
| APPLICATION NO. | : 10/128504 |
| DATED | : January 16, 2007 |
| INVENTOR(S) | : Toru Shiozaki et al. |

It is certified that error appears in the above-identified patent and that said Letters Patent is hereby corrected as shown below:

On the Title Page

In Item (56), References Cited, under U.S. Patent Documents, line 5, please change "6,486,989 B1" to --6,486,989 B2--.

In Item (56), References Cited, under U.S. Patent Documents, line 7, please change "6,687,036 B1" to --6,687,036 B2--.

Claim 3

In column 19, claim 3, lines 1-2, please change "claim 1 wherein" to --claim 1, wherein--.

Claim 4

In column 19, claim 4, lines 1-2, please change "claim 1 wherein" to --claim 1, wherein--.

UNITED STATES PATENT AND TRADEMARK OFFICE
CERTIFICATE OF CORRECTION

PATENT NO. : 7,164,858 B2
APPLICATION NO. : 10/128504
DATED : January 16, 2007
INVENTOR(S) : Toru Shiozaki et al.

It is certified that error appears in the above-identified patent and that said Letters Patent is hereby corrected as shown below:

Claim 5

In column 19, claim 5, lines 1-2, please change "claim 1 wherein" to --claim 1, wherein--.

Signed and Sealed this

Fifth Day of June, 2007

JON W. DUDAS
*Director of the United States Patent and Trademark Office*